(12) United States Patent
Chang

(10) Patent No.: US 8,592,530 B2
(45) Date of Patent: Nov. 26, 2013

(54) COPOLYESTER POLYOLS, PREPOLYMERS, AND POLYURETHANE ELASTOMERS FORMED THEREFROM AND PROCESSES FOR MAKING SAME

(75) Inventor: Biau-Hung Chang, Basking Ridge, NJ (US)

(73) Assignee: Chemtura Corporation, Middlebury, CT (US)

( * ) Notice: Subject to any disclaimer, the term of this patent is extended or adjusted under 35 U.S.C. 154(b) by 0 days.

(21) Appl. No.: 12/806,019

(22) Filed: Aug. 4, 2010

(65) Prior Publication Data

US 2011/0046338 A1 Feb. 24, 2011

Related U.S. Application Data

(60) Provisional application No. 61/235,786, filed on Aug. 21, 2009.

(51) Int. Cl.
*C08F 20/00* (2006.01)

(52) U.S. Cl.
USPC ............ 525/440.01; 525/437; 525/440.13; 525/410; 525/411; 525/415; 525/450; 528/272; 528/361

(58) Field of Classification Search
USPC ........... 525/437, 440.01, 440.13, 410, 411, 525/415, 450; 528/272, 361
See application file for complete search history.

(56) References Cited

U.S. PATENT DOCUMENTS

| | | | |
|---|---|---|---|
| 4,483,970 A * | 11/1984 | Huntjens et al. | 525/440.04 |
| 5,804,114 A | 9/1998 | Janes et al. | |
| 5,874,172 A | 2/1999 | Beach et al. | |
| 6,150,025 A | 11/2000 | Roe et al. | |
| 2003/0144454 A1 | 7/2003 | Krebs et al. | |
| 2008/0090973 A1* | 4/2008 | Nefzger et al. | 525/440.01 |

FOREIGN PATENT DOCUMENTS

| | | |
|---|---|---|
| DE | 23 44707 A1 | 6/1975 |
| GB | 1262383 | 2/1972 |

OTHER PUBLICATIONS

Szycher, M.; Handbook of Polyurethanes, 1999, p. 155-180.*

* cited by examiner

*Primary Examiner* — Robert Jones, Jr.
(74) *Attorney, Agent, or Firm* — Joseph Suhadolnik; George Romanik; Chemtura Corporation

(57) ABSTRACT

Polyurethane elastomers formed from prepolymers derived from copolyester polyols. The copolyester polyols have segments derived from one or more polyesters and caprolactone or polycaprolactone. The polyurethane elastomers have good hardness stability at temperatures ranging from 0° C. to 30° C. and preferably have good hydrolytic stability.

7 Claims, 2 Drawing Sheets

COPOLYESTER POLYOLS, PREPOLYMERS, AND POLYURETHANE ELASTOMERS FORMED THEREFROM AND PROCESSES FOR MAKING SAME

This application claims benefit under 35 USC 119(e) of U.S. provisional application No. 61/235,786, filed Aug. 21, 2009, the disclosure of which is incorporated by reference.

FIELD OF THE INVENTION

The present invention relates to copolyester polyols, to prepolymers formed therefrom, and to polyurethane elastomers and articles formed from such prepolymers. The invention also relates to processes for forming such copolyester polyols, prepolymers and polyurethane elastomers.

BACKGROUND OF THE INVENTION

Industrial polyurethane elastomers are based on polyurethane prepolymers made by reacting polyols with excess molar amounts of diisocyanate monomers. Polyester polyols are widely used due to ease of production and relatively low production costs. Polyurethane elastomers made from polyols, such as polyester polyols and polycarbonate polyols, have high crystallinity or melting points and tend to build up crystallinity or become harder over extended periods of time. This is especially true at temperatures less than 20° C. In other words, elastomers derived from polyester polyols become harder over extended time periods, and especially become harder at low temperatures. For applications requiring uniform performance properties and reduced environmental sensitivity, changes in properties such as hardness, crystallinity, hydrolytic stability, or environmental stability, are not desired. For example, environmental stability is especially important for polyurethane printing rolls since they require consistent and good printing performance over a wide range of temperatures and humidities.

Thus, the need exists for polyurethane elastomers that possess good environmental stability, especially at low temperatures, and for processes for making such polyurethane elastomers.

BRIEF SUMMARY OF THE INVENTION

The invention is directed to polyurethane elastomers that possess good environmental stability, especially at low temperatures, and to processes for making such polyurethane elastomers. The polyurethane elastomers are formed by curing copolyester polyol-based prepolymers that are derived from one or more polyesters and either or both caprolactone and/or polycaprolactone.

In a first embodiment, the invention is to a process for making a polyurethane elastomer, comprising: transesterifying one or more polyesters with a caprolactone or a polycaprolactone to form a copolyester polyol; reacting the copolyester polyol with a diisocyanate to form a prepolymer; and curing the prepolymer with a chain extender to form the polyurethane elastomer.

In a second embodiment, the invention is to a process for making a polyurethane elastomer, comprising reacting a dicarboxylic acid, a glycol, and a caprolactone or a polycaprolactone to form a copolyester polyol; reacting the copolyester polyol with a diisocyanate to form a prepolymer; and curing the prepolymer with a chain extender to form the polyurethane elastomer.

In a third embodiment, the invention is to a polyurethane elastomer comprising the reaction product of a polyurethane prepolymer and a chain extender, wherein the prepolymer is the reaction product of a diisocyanate and a copolyester polyol. The copolyester polyol comprises from 5 to 95 wt % segments derived from caprolactone and/or polycaprolactone, based on the total weight of the polyol.

In a fourth embodiment, the invention is to a polyurethane prepolymer that is the reaction product of a diisocyanate and copolyester polyol, wherein the copolyester polyol comprises from 5 to 95 wt % segments derived from caprolactone and/or polycaprolactone, based on the total weight of the polyol.

In a fifth embodiment, the invention is to a copolyester polyol comprising first segments derived from one or more polyesters and from 5 to 95 wt % second segments derived from caprolactone and/or polycaprolactone, based on the total weight of the copolyester polyol.

BRIEF DESCRIPTION OF THE DRAWINGS

The foregoing and other objects and advantages of our invention will appear more fully from the following description, made in connection with the accompanying drawing of non-limiting preferred embodiments of the inventions, wherein like characters refer to the same or similar parts throughout the views, and in which.

DETAILED DESCRIPTION OF THE INVENTION

Figure 1:
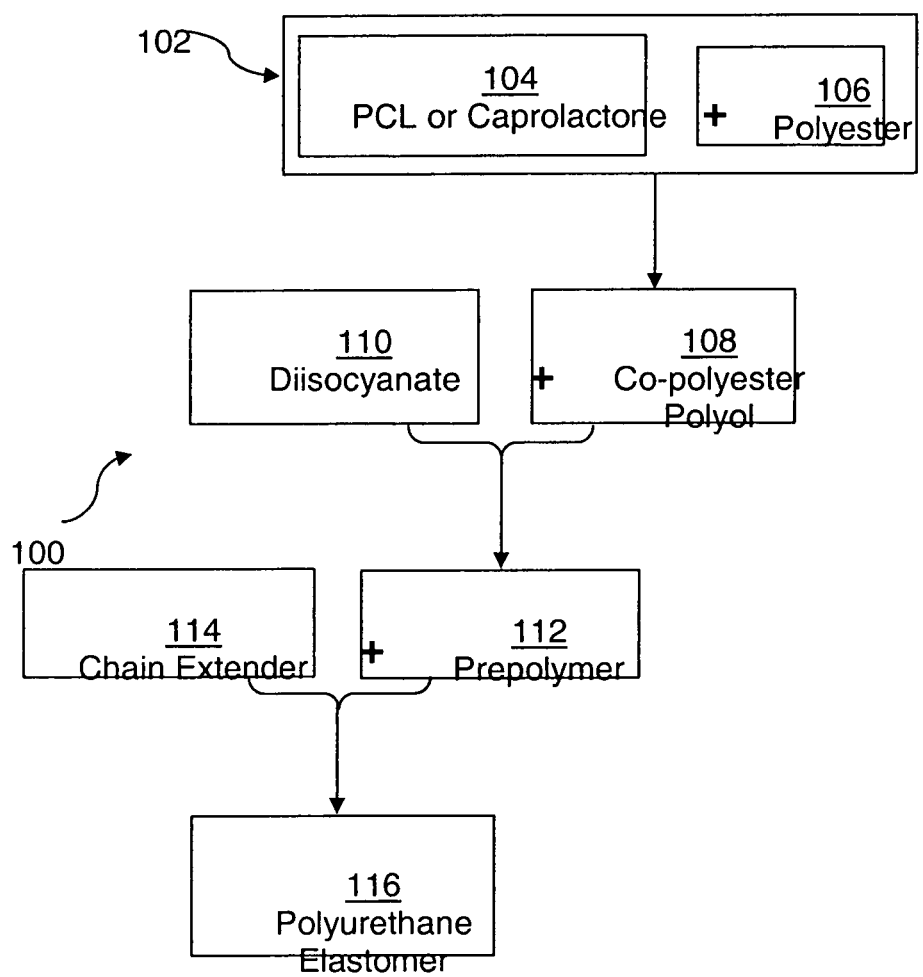
FIG. 1 is a reaction scheme flow diagram of a polyurethane elastomer formed from a copolyester polyol in accordance with one embodiment of the present invention.

The present invention, in one embodiment, is directed to a polyurethane prepolymer formed from the reaction between (i) a copolyester polyol and (ii) a diisocyanate. In another embodiment, the invention is directed to polyurethane elastomers formed from such prepolymers. For example, the polyurethane prepolymer may be cured with a chain extender, e.g., a polyol or a diamine, to form the polyurethane elastomer. The polyurethane elastomer preferably has improved hardness stability characteristics, for example, over temperatures ranging from 0° C. to 30° C.

Conventional polyurethane elastomers exhibit hardness variations at temperatures ranging from 0° C. to 30° C. Generally, as temperature decreases from 30° C. to 10° C., conventional polyurethane elastomers may exhibit a Shore A hardness increase of at least 5 A, e.g., at least 10 A or at least 15 A. Such hardness instability may be undesirable for certain applications, such as, for example, in print roller applications.

The polyurethane elastomers of the invention, in contrast, preferably have a hardness that remains unchanged or substantially unchanged over at least 13 days, e.g., at least 33 days or 6 months, at temperatures ranging from 0 to 30° C., e.g., from 10 to 15° C. In some exemplary embodiments, the hardness of the polyurethane elastomer varies by less than 5%, e.g., less than 2%, or less than 1% when held at 10° C., at 70% relative humidity, for 13 days. In another exemplary embodiment, the hardness varies by less than 5%, e.g., less than 2%, or less than 1% when held at 15° C., at 20% relative humidity, for 33 days. In another exemplary embodiment, the hardness varies by less than 5%, e.g., less than 2%, or less than 1% when held at 15° C., at 20% relative humidity, for 6 weeks. In terms of Shore A points, in one embodiment, the hardness of the polyurethane elastomer varies by less than 5

Shore A points, e.g., less than 3 Shore A points, or less than 1 Shore A points when held at 10° C., at 70% relative humidity, for 13 days. In another exemplary embodiment, the hardness varies by less than 5 Shore A points, e.g., less than 3 Shore A points, or less than 1 Shore A points when held at 15° C., at 20% relative humidity, for 33 days. In another exemplary embodiment, the hardness varies by less than 5 Shore A points, e.g., less than 3 Shore A points, or less than 1 Shore A points when held at 15° C., at 20% relative humidity, for 6 weeks.

The hardness of the polyurethane elastomers of the invention preferably varies, if at all, by less than 5 Shore A points, e.g., less than 4 Shore A points, less than 3 Shore A points, less than 2 Shore A points or less than 1 Shore A points, at temperatures ranging from 0° C. to 30° C., e.g., from 10 to 15° C.

In various optional embodiments, the polyurethane elastomers of the invention have a Shore A hardness of from 20 A to 98 A, e.g., from 50 A to 70 A, from 55 A to 73 A or from 60 to 71 A. Hardness of polyurethane articles is determined in accordance with ASTM procedure D2240-00, entitled, "Standard Test Method for Rubber Property—Durometer Hardness," the entirety of which is incorporated herein by reference. These softer materials may be useful, for example, in forming printing rollers, wheels, tires, squeegees, vibration mounts, mine screens, shock absorbing springs, blades, doctor blades, or dock fenders.

In one embodiment, the polyurethane elastomers of the invention also demonstrate improved hydrolytic stability. This improved hydrolytic stability may reduce the need for hydrolytic stabilizers such as, for example, triisopropanolamine (TIPA). Hydrolytic stability may be determined by measuring the change in hardness of the elastomer when heated in water to 70° C. for 12 days. Under these conditions, a variation in hardness of the elastomer, prepared from copolyester polyol of the present invention, of less than 5%, e.g., less than 3% or less than 2%, reflects an elastomer that is considered hydrolytically stable. In terms of Shore A points, hydrolytically stable elastomer prepared from copolyester polyol of the present invention exhibits a variation of less than 5 Shore A points, e.g., less than 3 Shore A points, or less than 1 Shore A points. Elastomers made from the copolyester polyols of the present invention are more hydrolytically stable than elastomers made from polyols that lack caprolactone or polycaprolactone segments.

The polyurethane elastomers of the present invention may be formed by reacting a prepolymer with a chain extender, e.g., a polyol or a diamine. The prepolymer, in turn, may be formed by reacting a copolyester polyol with a diisocyanate. The copolyester polyol may be formed in one of two mechanisms. In a first aspect, the copolyester polyol is formed by reacting a polyester with a caprolactone or a polycaprolactone in order to introduce caprolactone or polycaprolactone segments into the polyester and thereby form the copolyester polyol. In a second aspect, a dicarboxylic acid (e.g., adipic acid) is reacted with a glycol and caprolactone or a polycaprolactone to form the copolyester polyol.

Although polycaprolactone may be considered a polyester polyol, the terms "polyester polyol" and "caprolactone or polycaprolactone," as used herein, are mutually exclusive. That is, the term "polyester polyol," as used herein, excludes caprolactone and polycaprolactone. In addition, the terms "caprolactone" and "polycaprolactone," as used herein, include caprolactone and derivatives thereof, e.g., substituted caprolactone, as well as polycaprolactone and derivatives thereof. The term "copolyester polyol" refers to: (i) the reaction product of a polyester polyol and caprolactone or polycaprolactone; or (ii) the reaction product of a dicarboxylic acid, a dialkyl ester of a dicarboxylic acid or anhydride, a glycol and a caprolactone or a polycaprolactone.

Prepolymer

As indicated above, the polyurethane elastomers of the invention are the reaction product of a prepolymer and a chain extender. As employed herein, the term "prepolymer" means the reaction product of at least one copolyester polyol and a diisocyanate. The polyurethane prepolymer may be included in a prepolymer mixture that comprises the polyurethane prepolymer, an amount of unreacted diisocyanate, and optionally one or more solvents, plasticizers or other additives. As employed herein, the term "unreacted diisocyanate" refers to unreacted or residual diisocyanate monomer that is in the prepolymer mixture after formation of the polyurethane prepolymer.

Procedures for forming prepolymers are known in the art. In one embodiment, the prepolymer is made by reacting the copolyester polyol with a large excess of diisocyanate such as at a diisocyanate:copolyester polyol molar ratio greater than 2:1, e.g., greater than 4:1 or greater than 7:1. In terms of ranges, the molar ratio of diisocyanate to copolyester polyol, for example, may range from 1.4:1 to 20:1, e.g., from 1.6:1 to 15:1 or from 1.7:1 to 10:1. The diisocyanate and copolyester polyol preferably are reacted at a maximum temperature ranging from 30° C. to 120° C., e.g., from 50° C. to 110° C. In one embodiment, the reaction is carried out at a maximum temperature ranging from 50° C. to 110° C. with agitation.

Copolyester Polyol

As discussed above, the copolyester polyols of the invention are polyester polyols having some segments derived from caprolactone or polycaprolactone (polycaprolactone) and some segments derived from polyester polyols. In one embodiment, for example, the copolyester polyol comprises from 5 to 95 wt. %, e.g., from 10 to 50 wt. % or from 20 to 40 wt. % segments derived from caprolactone or polycaprolactone, based on the total weight of the copolyester polyol. The copolyester polyol also preferably comprises form 5 to 95 wt. %, e.g., from 50 to 90 wt. %, or from 60 to 80 wt. %, segments derived from polyester polyols, based on the total weight of the copolyester polyol. In other words, the copolyester polyol is a copolymer having one or more caprolactone segments randomly distributed in the polyester chain or a block copolymer having segments derived from caprolactone or polycaprolactone and segments derived from one or more polyesters (i.e., non-polycaprolactone polyesters). Without being bound by theory, it is believed that the introduction of caprolactone or polycaprolactone segments into a polyester polyol improves the stability of the subsequently formed polyurethane elastomers by reducing the crystallinity thereof.

In one embodiment, shown in reaction scheme 100 of FIG. 1, the copolyester polyol 108 is produced by reacting one or more polyesters 106 and a caprolactone or polycaprolactone 104 in a transesterification reaction 102. Copolyester polyol 108 is reacted with an diisocyanate 110 to form a prepolymer 112 that is subsequently reacted with a chain extender 114 to form polyurethane elastomer 116. The weight ratio of polyester to caprolactone or polycaprolactone is from 1:20 to 20:1, e.g., from 1:10 to 10:1, from 1:5 to 5:1 or from 1.5:1 to 2.5:1. The reaction is preferably conducted in an inert atmosphere, such as nitrogen, and optionally with agitation, at a temperature of from 100° C. to 250° C., e.g., from 150° C. to 240° C. from 175° C. to 225° C. or from 190° C. to 220° C. The reaction optionally is conducted under reduced pressure. The reaction may last, for example, for 1 to 45 hours, e.g., from 2 to 43 hours or from 5 to 40 hours. Optionally, catalyst, such as a tin or titanium catalyst, may be used in the reaction.

Representative polyesters that may be used in forming the copolyester polyol include, for example, poly(ethylene adipate)glycol, poly(diethylene adipate)glycol, poly(ethylene/diethylene adipate)glycol, poly(ethylene/propylene adipate) glycol, poly(butylene adipate)glycol, poly(ethylene/butylene adipate)glycol, poly(butylene/hexamethylene adipate) glycol, poly(hexamethylene adipate)glycol, poly(neopentyl adipate)glycol, poly(hexamethylene/neopentyl adipate)glycol, poly(ethylene succinate)glycol, poly(diethylene succinate)glycol, poly(ethylene/diethylene succinate)glycol, poly(ethylene/propylene succinate) glycol, poly(butylene succinate)glycol, poly(ethylene/butylene succinate)glycol, poly(butylene/hexamethylene succinate)glycol, poly(hexamethylene succinate)glycol, poly(neopentyl succinate) glycol, poly(hexamethylene/neopentyl succinate)glycol, poly(hexamethylene adipate/isophthalate)glycol, poly(butylene/hexamethylene adipate/isophthalate)glycol, poly(hexamethylene adipate/orthophthalate)glycol, poly(butylene/hexamethylene adipate/orthophthalate)glycol, poly(hexamethylene adipate/terephthalate)glycol, poly(butylene/hexamethylene adipate/terephthalate)glycol, poly(hexamethylene decanedioate)glycol, poly(butylene/hexamethylene decanedioate)glycol, poly(hexamethylene dodecanedioate)glycol, poly(butylene/hexamethylene dodecanedioate) glycol, poly(hexamethylene adipate/dodecanedioate)glycol, poly(butylene/hexamethylene adipate/dodecanedioate)glycol, poly(hexamethylene azelate)glycol, poly(butylene/hexamethylene azelate)glycol, poly(hexamethylene adipate/azelate)glycol, poly(butylene/hexamethylene adipate/azelate)glycol, and mixtures thereof. Preferably the polyester comprises poly(butylene/hexamethylene adipate)glycol or poly(hexamethylene adipate)glycol. In one embodiment, a mixture of two or more polyesters is used to form the copolyester (in combination with the caprolactone or the polyocaprolactone). Suitable commercial polyesters include, for example, Fomrez™ 66-56, Fomrez F46-56, Fomrez 66-20, Fomrez 66-225, Fomrez 66-28, Fomrez 66-32, Fomrez 8066-72, Fomrez C24-53U, Fomrez E24-56, Fomrez G24-56, Fomrez 124-56, and Fomrez 146-40.

Representative polycaprolactones that may be used in forming the copolyester polyols (in combination with one or more polyesters) include those having a weight average molecular weight of from 400 to 10,000 amu, e.g. 500 to 5,000 amu or from 900 to 2,500 amu. Commercially available polycaprolactones include, but are not limited to, Tone™ 0240, 1241, 2241, or 1231; Capa™ 2043, 2077A, 2100A, 2125, 2205, 2201, 2101A, 2123A, 2161A, 2200A, 2200D, 2200P, 2201A, 2203A, 2209, 2302A, 2303, 2304, 2402, 2403D, 2054, 2803, 3022, 3031, 3041, 3091, 3201, 3301, 4801, 7201A, 7203, HC1060, or HC1100; or Placcel™ 205, 208, 210, 220, 220 CPB, 230, 230 CP, 240 or 240CP, and mixtures thereof. The polycaprolactone is typically formed from an initiator diol such as diethylene glycol, 1,4-butanediol, neopentyl glycol, 1,6-hexanediol, or PTMEG. Triols such as trimethylolpropane (TMP) may also be employed as the initiator. More specifically, the polycaprolactone may be dimethylol propionic acid (DMPA) initiated Capa™ products.

Figure 2:
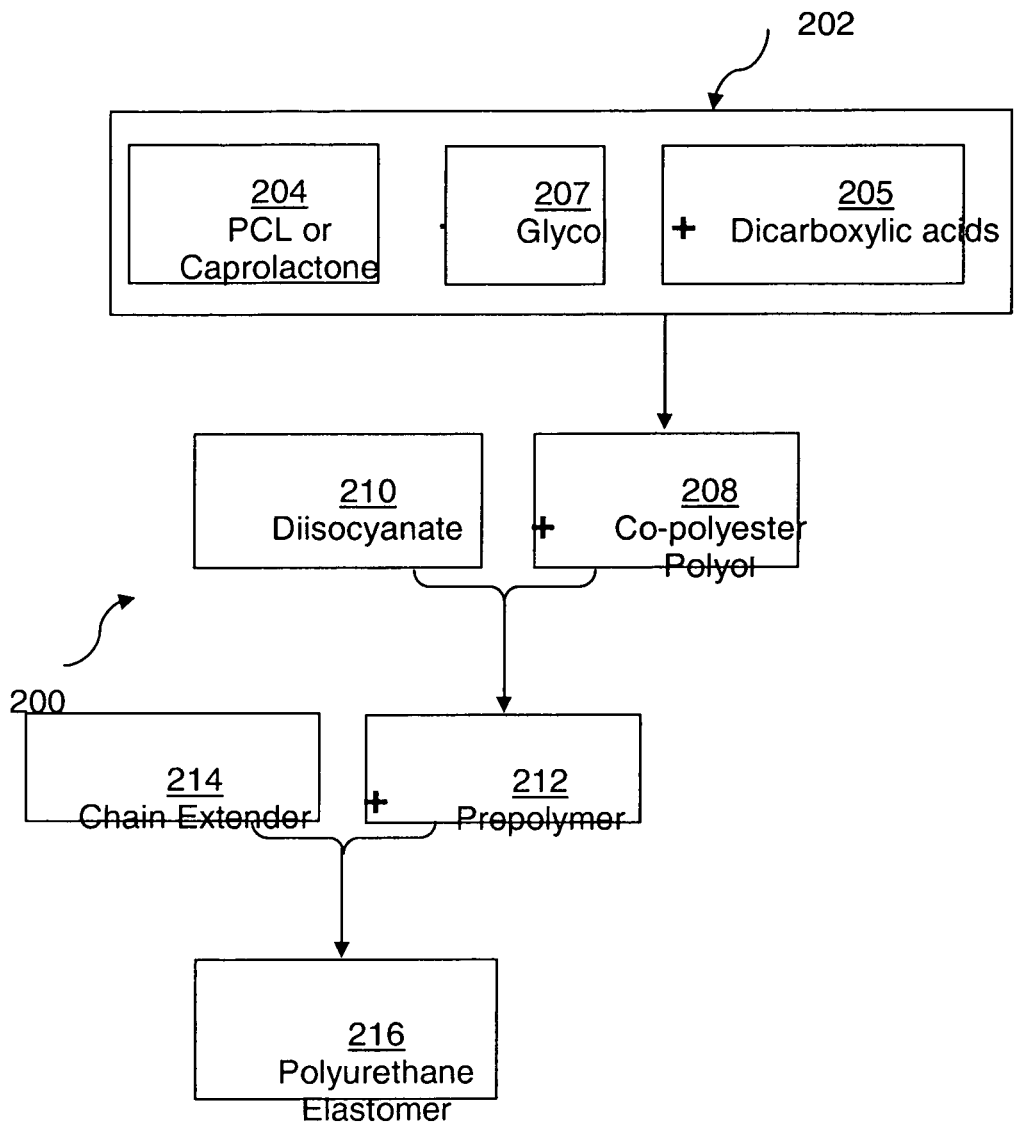
FIG. 2 is a reaction scheme flow diagram of a polyurethane elastomer formed from a copolyester polyol in accordance with another embodiment of the present invention.

In another embodiment, the copolyester polyol 208 is produced by a polycondensation 202 of a dicarboxylic acid 205, a glycol 207 and a polycaprolactone or a caprolactone 204 as shown in reaction scheme 200 in FIG. 2. In one embodiment, dialkyl esters of a dicarboxylic acid or anhydride may be used as an alternative for the dicarboxylic acid. Copolyester polyol 208 is reacted with a diisocyanate 210 to form a prepolymer 212 that is reacted with a chain extender 214 to from a polyurethane elastomer 216. Suitable dicarboxylic acids or anhydrides include, for example, adipic acid, succinic acid, isophthalic acid, phthalic anhydride, terephthalic acid, decanedioic acid, dodecanedioic acid, and azelaic acid. Dialkyl esters of such dicarboxylic acids may also be used, including, for example, dimethyl succinate and dimethyl terephthalate. Suitable glycols include, for example, ethylene glycol, propylene glycol, 1,3-propanediol, diethylene glycol, dipropylene glycol, 1,4-butanediol, 1,6-hexanediol, neopentyl glycol, 1,9-nonanediol, 1,10-decanediol, or 1,12-dodecanediol, and mixtures thereof. Suitable polycaprolactones are described above. In the reaction mixture the dicarboxylic acid may be present, for example, in an amount from 5 wt. % to 70 wt. %, based on the total weight of the reaction mixture, e.g., from 10 wt. % to 60 wt. % or from 30 wt. % to 55 wt. %; the glycol may be present in an amount of from 5 wt. % to 70 wt. %, e.g., from 10 wt. % to 40 wt. % or from 20 wt. % to 35 wt. %; and the caprolactone or polycaprolactone may be present in an amount of from 5 wt. % to 60 wt. %, e.g., from 10 wt. % to 40 wt. % or from 20 wt. % to 35 wt. %. In one embodiment, the dicarboxylic acid is the major component.

In the polycondensation reaction, the glycol may be initially charged to the reactor and heated to a temperature from 60° C. to 100° C., e.g., from 70° C. to 95° C. The glycol is stirred once heated and the dicarboxylic acid is added. The temperature then preferably is increased to a temperature from 160° C. to 190° C., e.g., from 170° C. to 185° C., ideally under vacuum or a nitrogen flow to remove water. Caprolactone or polycaprolactone may then be charged to the reaction mixture and the heating continued to a final temperature of from 100° C. to 250° C., e.g., from 200° C. to 240° C., e.g., from 200° C. to 220° C. The nitrogen flow may be increased during the continued heating. The reaction is stopped once the desired hydroxyl and acid numbers are obtained, typically through sampling of the reaction mixture. Finally, the reaction mixture is cooled to a temperature from 90° C. to 140° C.

Isocyanate

As indicated above, the copolyester polyol is reacted with a diisocyanate to form the polyurethane prepolymer. The diisocyanate may be selected from, for example, diphenylmethane diisocyanate (MDI), 2,4-toluene diisocyanate (2,4-TDI), 2,6-toluene diisocyanate (2,6-TDI), para-phenylene diisocyanate (PPDI), 1,6-hexane diisocyanate (HDI), isophorone diisocyanate (IPDI), 3,3'-bitoluene diisocyanate (TODI), 1,4-cyclohexyl diisocyanate (CHDI), naphthalene-1,5-diisocyanate (NDI), or methylene bis(p-cyclohexyl isocyanate) ($H_{12}$MDI), and mixtures thereof. In one embodiment, MDI and 2,4-TDI are used as the diisocyanate. In one embodiment, a prepolymer mixture is formed comprising the prepolymer and having an unreacted diisocyanate content of from 0.1 to 15.0 wt %, e.g., from 0.25 to 4.0 wt % or from 0.5 to 3.5 wt %, based on the total weight of the prepolymer mixture.

In various optional embodiments, the copolyester polyol that is reacted with the diisocyanate forms a polyurethane prepolymer having a molecular weight ranging from 250 to 10,000 amu, e.g., from 300 to 5,000 amu or from 500 to 2,500 amu.

The polyurethane prepolymer may comprise adducts having an "isocyanate-copolyester polyol-isocyanate" structure (here termed "ABA" structure, where A denotes isocyanate and B denotes the copolyester polyol), or higher molecular weight adducts that contain two or more polyol moieties (here termed "oligomers" of structure "ABABA," "ABABABA," etc.). In one embodiment, when excess starting amounts of A are used, the formation of ABA structure may be favored over oligomers of structure ABABA or ABABABA. In general, the formation of oligomers of structure ABABA or ABABABA are less favored.

When the copolyester polyol B is difunctional (being formed from diols and having two OH end groups per molecule), each ABA and ABABA adduct has two unreacted NCO groups, one on each of the terminal A moieties. The internal A moiety in the ABABA adduct has no remaining unreacted NCO group. Therefore, the ABABA adduct has a lower weight percentage NCO content than does the ABA adduct. A large molar excess of isocyanate over the copolyester polyol minimizes oligomer formation.

As an illustration, consider a difunctional copolyester polyol of number average molecular weight (mw) 1000 and an diisocyanate having mw 250. Thus, the ABA adduct would have an mw of 250+1000+250, or 1500. The ABA adduct would also have two NCO end groups, of 42 daltons each. Thus, the theoretical NCO content would be 2(42)/1500=5.6% by weight for the ABA structure. By a similar calculation, it is seen that the ABABA structure would have a theoretical NCO content of 2(42)/2750=3.05% by weight.

Chain Extenders

The prepolymers may be easily chain-extended by various chain extenders, also referred to as curatives, at moderate processing temperatures. The molar ratio of prepolymers to curatives, for example, may be in the range of from 0.5:1 to 1.5:1, e.g., from 0.7:1 to 1.2:1 or from 1.1:1 to 0.95:1. The amount of curative may, also be calculated by the following formula:

$$C_{100p} = \frac{(NCO\ \%)(C_{ew})(\%\ Theory)}{4202}$$

where $C_{100p}$ is the parts curative per 100 parts prepolymer, NCO % is percent of NCO content of the prepolymer, $C_{ew}$, is the equivalent weight of the curative, and % Theory is the stoichiometry for the curative. Thus, for example, the calculated amount of a curative with an equivalent weight of 133.5 and 95% stoichiometry cured with a prepolymer having 4.1 NCO % would be 12.4 parts of curative per 100 parts prepolymer on a mass basis.

The chain extenders may be selected, for example, from one or more of water, diols, triols, polyols, diamines, or mixtures thereof. Representative polyol chain extenders include aliphatic diols, such as 1,4-butanediol (BDO), polybutadiene polyol, resorcinol di (beta-hydroxyethyl)ether (HER), resorcinol di(beta-hydroxypropyl)ether (HPR), hydroquinone-bis-hydroxyethyl ether (HQEE), 1,3-propanediol, ethylene glycol, 1,6-hexanediol, and 1,4-cyclohexane dimethanol (CHDM), triols and tetrols, such as trimethylol propane (TMP), triisopropanolamine, and triethanolamine; and adducts of propylene oxide and/or ethylene oxide having molecular weights in the range of from 190 to 500, such as various grades of Poly G™, Voranol™, Simulsol, Polyol TP 30LW trimethylolpropane-ethylene oxide adduct, Pluracol™ and Quadrol™; and mixtures thereof.

Representative diamine chain extenders include 4,4'-methylene-bis(2-chloroaniline) (MBCA); 4,4'-methylene-bis(3-chloro-2,6-diethylaniline) (MCDEA); diethyl toluene diamine (DETDA; Ethacure™ 100 from Albemarle Corporation); tertiary butyl toluene diamine (TBTDA); dimethylthio-toluene diamine (Ethacure™ 300); trimethylene glycol dip-amino-benzoate (Vibracure™ A157 or Versalink™ 740M); methylene bis orthochloroaniline (MOCA), methylene bis diethylaniline (MDEA); methylenedianiline (MDA); and MDA-salt complexes (Caytur™ 21, 21-DA, 31, and 31-DA, and Duracure C3 and Duracure C3-LF) and mixtures thereof.

Caytur™ 21 and Caytur™ 21-DA are blocked delayed action amine curatives for use with isocyanate terminated urethane prepolymers. Such curatives comprise a complex of MDA and sodium chloride dispersed in a plasticizer (dioctyl phthalate in case of Caytur 21 and dioctyl adipate in case of Caytur 21-DA) and optionally a pigment. Caytur 21 has 50% active solids dispersed in DOP. Caytur 21-DA has 60% active solids dispersed in DOA. Caytur 31 has a low free MDA content (typically <2.00%). Amine group concentration is 6.45% in Caytur 21 and 7.72% in Caytur 21-DA. Hence the equivalent weight is 219 for Caytur 21 and 183 for Caytur 21-DA. At room temperature each curative reacts very slowly with terminal isocyanate groups. However at 100° C.-150° C., the MDA-salt complex unblocks and the freed MDA reacts rapidly with the prepolymer to form the elastomer. A variety of salts may be used to form such complexes with MDA, including sodium chloride, sodium bromide, potassium chloride, and lithium chloride. Sodium chloride is preferred.

Caytur 31™ and Caytur™ 31-DA are blocked delayed action amine curatives for use primarily with isocyanate terminated urethane prepolymers. Such curatives comprise a complex of MDA and sodium chloride dispersed in a plasticizer (dioctyl phthalate in case of Caytur 31 and dioctyl adipate in case of Caytur 31-DA) and optionally a pigment. Caytur 31 has a very low free MDA content (typically <0.5%). At room temperature, such curatives are virtually non-reactive. However at 115° C.-160° C., the salt unblocks and the freed MDA reacts rapidly with the prepolymer to form a tough elastomer. Amine group concentration is 5.78% in Caytur 31 and Caytur 31-DA. Hence the equivalent weight is about 244 to about 250 for Caytur 31 and Caytur 31-DA. These groups are blocked by sodium chloride.

Preferred chain extenders include polybutadiene diol, BDO, HQEE, MBCA, trimethylolpropane (TMP), MCDEA, Ethacure™ 300, Caytur™ 21-DA and 31-DA, Duracure C3 and C3-LF, triisopropanolamine, triethanolamine, and trimethylolpropane-ethylene oxide adducts.

The temperature employed for curing the reaction mixture may vary, but will typically be greater than 40° C., e.g., greater than 70° C. or greater than 90° C. In terms of ranges, the curing temperature optionally is from 20° C. to 160° C., e.g., from 90° C. to 150° C. Reactivity and cure temperature can be adjusted with catalyst depending on the chain extender employed.

In one embodiment of the invention, the process of curing the pre-elastomer mixture may be done using a cool technique. A cool technique involves pouring the pre-elastomer mixture, which is at a temperature of about 50° C. or less, into a mold that is at a temperature of about 50° C. or less, e.g., less than 40° C. or less than 30° C. Once the mold is filled, the oven temperature is increased, for example to a temperature of about 120° C., in order to de-block the chain extender and initiate the cure. The rate at which the temperature of the mold should increase may vary.

In one embodiment, the elastomer may also comprise from 0.5 to 30%, e.g., from 1.0 to 20% of a conductive additive, as described in U.S. Pat. Nos. 5,804,114, 5,874,172 and 6,150,025, the entire contents and disclosures of which are hereby incorporated by reference. Conductive additives include ferric chloride, ferrous chloride, calcium chloride, and cobalt hexafluoroacetylacetonate.

Other ingredients that are known to those skilled in the art may be used with the prepolymer and/or the elastomer, and are understood to include, but not be limited to, density-adjusting coupling agents, plasticizers, surfactants, lubricants, colorants (e.g., pigments), bactericides, fungicides, grinding aids, antistatic agents, blowing or foaming agents, sulfur accelerators, and/or non-peroxide radical sources. Plasticizer include, but are not limited to, phthalates, such as diisodecyl phthalate (DIDP), di-n-octyl phthalate (DOP), and diisooctyl phthalate (DIOP), and other such as tributoxy ethyl phosphate (TBEP), or dipropylene glycol dibenzoate. Suitable commerically available plasticizers include Benzoflex 9-88SG made by Genovique Specialties.

The advantages and the important features of the invention will be more apparent from the following examples.

EXAMPLES

Example 1

Preparation of Copolyester Polyol

In a reaction flask, 787 g of poly(hexamethylene adipate) glycol (Fomrez™ 66-56) 2413 g of poly(butylene/hexamethylene adipate)glycol (Fomrez™ F46-56) and 800 g of polycaprolactone (Capa™ 2201 A) were charged. The reaction mixture was heated under nitrogen at 210° C. to 220° C. for 42 hours.

Example 2

Preparation of Copolyester polyol

In a reaction flask, 2580 g of poly(hexamethylene adipate) glycol (Fomrez™ 66-56) and 1720 g of polycaprolactone (Capa™ 2201A) were charged. The reaction mixture was heated under nitrogen at 210° C. to 220° C. for 40 hours.

Example 3

Preparation of Prepolymer

In a reaction flask, 713.0 g of 2,4-toluenediisocyanate (2,4-TDI) and 0.35 g of benzoyl chloride were charged. The reaction mixture was agitated under nitrogen and heated to 50° C. Half of the 4072.9 g of copolyester polyol of Example 1 was added. The reaction mixture was stirred for 10 to 20 minutes and the reaction temperature was maintained at below 75° C. 14.1 g of trimethylolpropane (TMP) was charged. After being stirred for 5 to 10 minutes, the remainder of the copolyester polyol of Example 1 was added. After the exothermic reaction subsided, the reaction mixture was then heated under nitrogen at 80° C. to 85° C. for 2.5 hours. The analysis indicated the reaction mixture had a NCO content of 3.35%.

Example 4

Preparation of the Prepolymer

In a reaction flask, 718.0 g of 2,4-toluenediisocyanate (2,4-TDI) and 0.35 g of benzoyl chloride were charged. The reaction mixture was agitated under nitrogen and heated to 50° C. Half of the 4067.8 g of copolyester polyol of Example 2 was added. The reaction mixture was stirred for 10 to 20 minutes and the reaction temperature was maintained at below 75° C. 14.1 g of trimethylolpropane (TMP) was charged. After being stirred for 5 to 10 minutes, the remainder of the copolyester polyol of Example 2 was added. After the exothermic reaction subsided, the reaction mixture was then heated under nitrogen at 80° C. to 85° C. for 2.5 hours. The analysis indicated the reaction mixture had a NCO content of 3.43%.

Example 5

Polyurethane Elastomers

In a cup, 100 phr of the prepolymer of Example 3 was added. 18.1 phi of methylenedianiline-sodium chloride complex in dioctyladipate (Caytur™ 31-DA) was mixed slowly and thoroughly for several minutes. The reaction mixture was poured into a mold and cured at 140° C. for 24 hours. The cured parts were then removed from the mold and had a Shore hardness of 70 A-71 A.

Example 6

Polyurethane Elastomers

In a cup, 100 phr of the prepolymer of Example 3 was added and heated to 70° C. in an oven. 15.6 phr of polybutadiene diol (polybd R-45HT) and 5.7 phr of trimethylolpropane-ethylene oxide adduct, a polyether triol (Polyol TP30 LW) containing 3.78% ferric chloride (pre-dissolved in the polyether triol) was preheated at 70° C. in an oven and were then added. The reaction mixture was well mixed and poured into a mold and cured at 100° C. for 0.5 hours. The cured parts were then removed from the mold and post cured upon exposure to air at 100° C. for 12 hours. The cured parts had a Shore hardness of 60 A.

Example 7

Polyurethane Elastomers

In a cup, 100 phr of the prepolymer of Example 4 was added and heated to 70° C. in an oven. 15.6 phr of polybutadiene diol (polybd R-45HT) and 5.7 phr of polyether triol (TP30 LW) containing 3.78% ferric chloride (pre-dissolved in the polyether triol) was preheated at 70° C. in an oven and were then added. The reaction mixture was well mixed and poured into a mold and cured at 100° C. for 0.5 hours. The cured parts were then removed from the mold and post cured upon exposure to air at 100° C. for 12 hours. The cured parts had a Shore hardness of 61 A.

Example 8

Polyurethane Elastomers

In a cup, 100 phr of the prepolymer of Example 3 was added. 10.1 phr of methylene bis orthochloroaniline (MOCA) was mixed slowly and thoroughly for several minutes. The reaction mixture was poured into a mold and cured at 115° C. for 24 hours. The cured parts were then removed from the mold and had a Shore hardness of 61 A.

Example 9

Environmental Sensitivity

The cured parts from Examples 5, 6, and 7 were tested under the low temperature and humidity conditions shown in Table 1. Example 5 is compared with comparative A, which is a poly(butylene/hexamethylene adipate)glycol-based TDI prepolymer cured in a similar manner as Example 5. Example 6 is compared with comparative B, which is a poly(butylene/hexamethylene adipate)glycol-based TDI prepolymer cured in a similar manner as Examples 6 and 7.

TABLE 1

| Ex. | Test Conditions | | | Initial Hardness | Hardness After Test | Change | % Change |
|---|---|---|---|---|---|---|---|
| | Relative Humidity | Temp. | Period | | | | |
| 5 | 70% | 10° C. | 13 days | 70 A | 71 A | +1 A | 1.43% |
| A | 70% | 10° C. | 13 days | 65 A | 88 A | +23 A | 35.4% |
| 6 | 20% | 15° C. | 6 weeks | 60 A | 61 A | +1 A | 1.67% |
| B | 20% | 15° C. | 6 weeks | 61 A | 81 A | +20 A | 32.8% |
| 7 | 20% | 15° C. | 33 days | 61 A | 61 A | No change | 0% |

Example 5 surprisingly and unexpectedly showed improved stability over comparative A under the same conditions. Example 6 surprisingly and unexpectedly showed improved stability over comparative B under the same conditions. Polyurethane elastomers that do not contain caprolactone or polycaprolactone-derived segments do not demonstrate similar stability as shown by comparative A and B.

Example 10

Polyurethane Elastomers

In a cup, 100 phr of the prepolymer from Example 4 was added and heated to 100° C. in an oven or using a microwave oven. Molten TMP preheated at 100° C. (3.47 phr) was mixed thoroughly for several minutes. The reaction mixture was poured into a mold and cured at 121° C. for 24 hours. The cured parts were then removed from the mold. The cured parts had a hardness of 62 Shore A.

Example 11

Polyurethane Elastomers

In a cup, 85 phr of the prepolymer from Example 4 and 15 phr of a dipropylene glycol dibenzoate (Benzoflex 9-88SG made by Genovique Specialties) was added and heated to 100° C. in an oven or using a microwave oven. Molten TMP preheated at 100° C. (2.95 phr) was mixed thoroughly for several minutes. The reaction mixture was poured into a mold and cured at 121° C. for 24 hours. The cured parts were then removed from the mold. The cured parts had a hardness of 54 Shore A.

Example 12

Hydrolytic Stability

The hydrolytic stability was tested by measuring the change in hardness after 12 days of the polyurethane elastomer heated in water at 70° C. Example 10 is compared with comparative example C, a poly(butylene/hexamethylene adipate)glycol-based TDI prepolymer cured with TMP as shown in Example 10. Example 11 is compared with comparative example D, a poly(butylene/hexamethylene adipate)glycol-based TDI prepolymer having a plasticizer and cured with TMP as shown in Example 11. The results are shown in Table 2.

TABLE 2

| Ex. | Initial Hardness | Hardness After Test | Change | % Change |
|---|---|---|---|---|
| 10 | 61 A | 59 A | −2 A | 3.28% |
| C | 61 A | 46 A | −15 A | 24.6% |
| 11 | 54 A | 53 A | −1 A | 1.85% |
| D | 53 A | 39 A | −14 A | 26.42% |

Example 10 surprisingly and unexpectedly showed improved hydrolytic stability over comparative example C under the same conditions. Example 11 surprisingly and unexpectedly showed improved hydrolytic stability over comparative example D under the same conditions. Polyurethane elastomers that do not contain caprolactone or polycaprolactone did not demonstrate similar hydrolytic stability as shown by comparative examples C and D.

In view of the many changes and modifications that can be made without departing from principles underlying the invention, reference should be made to the appended claims for an understanding of the scope of the protection to be afforded the invention.

What is claimed is:

1. A process for making a polyurethane elastomer, comprising:
   transesterifying
   one or more polyesters selected from the group consisting of poly(ethylene adipate) glycol, poly(diethylene adipate) glycol, poly(ethylene/diethylene adipate) glycol, poly(ethylene/propylene adipate) glycol, poly(butylene adipate) glycol, poly(ethylene/butylene adipate) glycol, poly(butylene/hexamethylene adipate) glycol, poly(hexamethylene adipate) glycol, poly(neopentyl adipate) glycol, poly(hexamethylene/neopentyl adipate) glycol, poly(ethylene succinate) glycol, poly(diethylene succinate) glycol, poly(ethylene/diethylene succinate) glycol, poly(ethylene/propylene succinate) glycol, poly(butylene succinate) glycol, poly(ethylene/butylene succinate) glycol, poly(butylene/hexamethylene succinate) glycol, poly(hexamethylene succinate) glycol, poly(neopentyl succinate) glycol, poly(hexamethylene/neopentyl succinate) glycol, poly(hexamethylene decanedioate) glycol, poly(butylene/hexamethylene decanedioate) glycol, poly(hexamethylene dodecanedioate) glycol, poly(butylene/hexamethylene dodecanedioate) glycol, poly(hexamethylene adipate/dodecanedioate) glycol, poly(butylene/hexamethylene adipate/dodecanedioate) glycol, poly(hexamethylene azelate) glycol, poly(butylene/hexamethylene azelate) glycol, poly(hexamethylene adipate/azelate) glycol, poly(butylene/hexamethylene adipate/azelate) glycol, and mixtures thereof, with
   a polycaprolactone to form a copolyester polyol wherein the polycaprolactone has a weight average molecular weight of from 400 to 10,000 amu and the weight ratio of the one or more polyesters to the polycaprolactone is from 1:5 to 5:1;

reacting the copolyester polyol with diphenylmethane diisocyanate or 2,4-toluene diisocyanate to form a prepolymer; and curing the prepolymer with a diamine chain extender or a polyol chain extender selected from the group consisting of polybutadiene polyol, resorcinol di(beta-hydroxyethyl) ether , resorcinol di(beta-hydroxypropyl) ether, hydroquinone-bis-hydroxyethyl ether, 1,4-cyclohexane dimethanol, trimethylol propane, triisopropanolamine, triethanolamine; adducts of propylene oxide having molecular weights in the range of from 190 to 500 and adducts of ethylene oxide having molecular weights in the range of from 190 to 500, to form the polyurethane elastomer.

2. A process for making a polyurethane elastomer, comprising:

reacting (a) a dicarboxylic acid, or a dialkyl ester of a dicarboxylic acid selected from the group consisting of adipic acid, succinic acid, dimethyl succinate, decanedioic acid, dodecanedioic acid, azelaic acid, and mixtures thereof with (b) a glycol, and (c) a polycaprolactone in a reaction mixture to form a copolyester polyol wherein the polycaprolactone is present in an amount of 5 wt. % to 60 wt. %, based on the total weight of the reaction mixture;

reacting the copolyester polyol with diphenylmethane diisocyanate or 2,4-toluene diisocyanate to form a prepolymer; and curing the prepolymer with a diamine chain extender or a polyol chain extender selected from the group consisting of polybutadiene polyol, resorcinol di(beta-hydroxyethyl) ether, resorcinol di(beta-hydroxypropyl) ether, hydroquinone-bis-hydroxyethyl ether, 1,4-cyclohexane dimethanol, trimethylol propane, triisopropanolamine, triethanolamine; adducts of propylene oxide having molecular weights in the range of from 190 to 500 and adducts of ethylene oxide having molecular weights in the range of from 190 to 500, to form the polyurethane elastomer.

3. The process of claim 2, wherein the glycol is selected from the group consisting of ethylene glycol, propylene glycol, 1,3-propanediol, diethylene glycol, dipropylene glycol, 1,4-butanediol, 1,6-hexanediol, neopentyl glycol, 1,9-nonanediol, 1,10-decanediol, or 1,12-dodecaendiol; and mixtures thereof.

4. The process according to claim 1 wherein the diamine chain extender is selected from the group consising of 4,4'-methylene-bis(2-chloroaniline); 4,4'-methylene-bis(3-chloro-2,6-diethylaniline; diethyl toluene diamine; tertiary butyl toluene diamine; dimethylthio-toluene diamine; trimethylene glycol di-p-amino-benzoate; methylene bis orthochloroaniline, methylene bis diethylaniline; methylene-dianiline; and methylenedianiline-salt complexes.

5. The process according to claim 1 wherein the polyol chain extender is selected from the group consisting of polybutadiene polyol, resorcinol di(beta-hydroxyethyl) ether, trimethylol propane, triisopropanolamine, triethanolamine; and trimethylol propane ethylene oxide adducts.

6. The process according to claim 2 wherein the diamine chain extender is selected from the group consising of 4,4'-methylene-bis(2-chloroaniline); 4,4'-methylene-bis(3-chloro-2,6-diethylaniline; diethyl toluene diamine; tertiary butyl toluene diamine; dimethylthio-toluene diamine; trimethylene glycol di-p-amino-benzoate; methylene bis orthochloroaniline, methylene bis diethylaniline; methylene-dianiline; and methylenedianiline-salt complexes.

7. The process according to claim 2 wherein the polyol chain extender is selected from the group consisting of polybutadiene polyol, resorcinol di(beta-hydroxyethyl) ether , trimethylol propane, triisopropanolamine, triethanolamine;and trimethylol propane ethylene oxide adducts.

\* \* \* \* \*